US012801826B2

(12) United States Patent
Lai et al.

(10) Patent No.: US 12,801,826 B2
(45) Date of Patent: Nov. 17, 2026

(54) METHOD, APPARATUS, TERMINAL AND STORAGE MEDIUM FOR DOCUMENT PROCESSING

(71) Applicant: Beijing Zitiao Network Technology Co., Ltd., Beijing (CN)

(72) Inventors: Qingyu Lai, Beijing (CN); Xiaochun Zhang, Beijing (CN); Zhongjie Fu, Beijing (CN); Xuebin Yang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/628,110

(22) Filed: Apr. 5, 2024

(65) Prior Publication Data

US 2024/0249065 A1 Jul. 25, 2024

Related U.S. Application Data

(63) Continuation of application No. PCT/CN2022/123396, filed on Sep. 30, 2022.

(30) Foreign Application Priority Data

Oct. 8, 2021 (CN) .......................... 202111172527.9

(51) Int. Cl.
*G06F 40/103* (2020.01)
*G06F 3/0482* (2013.01)
(Continued)

(52) U.S. Cl.
CPC .......... *G06F 40/103* (2020.01); *G06F 3/0482* (2013.01); *G06F 3/04845* (2013.01); *G06F 40/177* (2020.01)

(58) Field of Classification Search
CPC .... G06F 40/103; G06F 40/177; G06F 3/0482; G06F 3/04845
See application file for complete search history.

(56) References Cited

U.S. PATENT DOCUMENTS

| | | | | |
|---|---|---|---|---|
| 5,633,996 A * | 5/1997 | Hayashi | G06F 40/103 | 715/246 |
| 6,044,134 A * | 3/2000 | De La Huerga | H04M 3/53333 | 379/88.08 |

(Continued)

FOREIGN PATENT DOCUMENTS

| | | |
|---|---|---|
| CN | 1823330 A | 8/2006 |
| CN | 101158972 A | 4/2008 |

(Continued)

OTHER PUBLICATIONS

Tech Pro Advice, "how to insert columes in MS Word", Feb. 10, 2020, https://www.youtube.com/watch?v=9zW55BtRZUI (Year: 2020).*

(Continued)

*Primary Examiner* — Patrick F Riegler

(57) ABSTRACT

A method, apparatus, terminal and storage medium for document processing. In some embodiments, there is provided a method for document processing, including: determining a current state of a column area in a document area (S11); if the current state is an unselected state, displaying the column area and a non-column area integratedly (S12); or, if the current state is a selected state, displaying the column area and the non-column area separately (S13), so that users can effectively distinguish whether an area is in the column area and can quickly switch between the column area and the non-column area.

18 Claims, 6 Drawing Sheets

(51) Int. Cl.

| | |
|---|---|
| ***G06F 3/04845*** | (2022.01) |
| ***G06F 40/177*** | (2020.01) |

(56) References Cited

U.S. PATENT DOCUMENTS

| | | | | |
|---|---|---|---|---|
| 6,988,241 | B1 * | 1/2006 | Guttman | G06F 16/9566 707/E17.115 |
| 9,817,566 | B1 * | 11/2017 | Silvis | G06F 3/04847 |
| 9,977,772 | B1 * | 5/2018 | Samadani | G06F 3/04883 |
| 10,521,501 | B2 * | 12/2019 | Park | G06F 40/177 |
| 10,942,632 | B1 * | 3/2021 | Sefton | G06F 3/04845 |
| 12,154,037 | B1 * | 11/2024 | Swartz | G06N 5/022 |
| 2002/0075309 | A1 * | 6/2002 | Michelman | G06F 3/04842 715/764 |
| 2002/0158876 | A1 * | 10/2002 | Janssen | G06F 40/103 345/504 |
| 2003/0229607 | A1 * | 12/2003 | Zellweger | G06F 16/322 |
| 2005/0050088 | A1 * | 3/2005 | Kotler | G06F 40/18 707/999.102 |
| 2005/0071736 | A1 * | 3/2005 | Schneider | G06F 16/4393 715/201 |
| 2006/0061597 | A1 * | 3/2006 | Hui | G06F 3/0481 345/629 |
| 2006/0136807 | A1 * | 6/2006 | Yalovsky | G06F 40/177 715/256 |
| 2007/0291036 | A1 * | 12/2007 | McArdle | G06F 30/00 345/441 |
| 2008/0016437 | A1 * | 1/2008 | Fenkes | G06F 40/18 715/833 |
| 2009/0013245 | A1 * | 1/2009 | Cudich | G06F 40/14 715/234 |
| 2010/0083092 | A1 * | 4/2010 | Schuller | G06F 16/211 707/E17.058 |
| 2010/0299587 | A1 * | 11/2010 | Swett | G06F 40/177 715/862 |
| 2012/0089896 | A1 * | 4/2012 | Harasemchuk | G06V 30/412 715/227 |
| 2012/0117500 | A1 * | 5/2012 | Maim | G06F 40/18 715/781 |
| 2012/0185766 | A1 * | 7/2012 | Mansfield | G06F 40/137 715/246 |
| 2012/0288845 | A1 * | 11/2012 | Kumar GL | G09B 7/06 434/362 |
| 2013/0305147 | A1 * | 11/2013 | McBride | G06Q 10/06311 715/256 |
| 2014/0115446 | A1 | 4/2014 | Hall et al. | |
| 2014/0189482 | A1 * | 7/2014 | Hill | G06F 40/18 715/212 |
| 2014/0289602 | A1 * | 9/2014 | Park | G06F 40/177 715/227 |
| 2014/0359419 | A1 * | 12/2014 | Kang | G06F 40/18 715/227 |
| 2014/0372857 | A1 * | 12/2014 | Otero | G06F 40/174 715/220 |
| 2014/0372933 | A1 * | 12/2014 | Shirolkar | G06F 40/18 715/780 |
| 2015/0149876 | A1 * | 5/2015 | Davis | G06F 16/972 715/212 |
| 2016/0334954 | A1 * | 11/2016 | Gur | G06F 3/0482 |
| 2017/0139884 | A1 * | 5/2017 | Bendig | G06F 40/177 |
| 2017/0154101 | A1 * | 6/2017 | Raghavan | G06F 16/22 |
| 2017/0185668 | A1 * | 6/2017 | Convertino | G06F 40/18 |
| 2017/0235706 | A1 * | 8/2017 | Esterly | G06F 3/0481 715/243 |
| 2018/0189250 | A1 * | 7/2018 | Lee | G06F 40/166 |
| 2022/0036311 | A1 * | 2/2022 | Didrickson | G06F 40/131 |

FOREIGN PATENT DOCUMENTS

| | | | |
|---|---|---|---|
| CN | 104111823 | A | 10/2014 |
| CN | 104239305 | A | 12/2014 |
| CN | 113128185 | A | 7/2021 |

OTHER PUBLICATIONS

EHowTech, "How to Make Columns in Word", May 27, 2015, https://www.youtube.com/watch?v=fQDDQu5mYAc (Year: 2015).*

Ehow, Kyle Parker, "Using Microsoft Word : How to Add Columns to a Microsoft Word Document", Jan. 26, 2009, https://www.youtube.com/watch?v=yw4P9c8v3pl (Year: 2009).*

International Search Report and Written Opinion for International Application No. PCT/CN2022/123396, mailed Nov. 29, 2022, 13 Pages.

* cited by examiner

METHOD, APPARATUS, TERMINAL AND STORAGE MEDIUM FOR DOCUMENT PROCESSING

CROSS REFERENCE

The present application is a continuation of International Patent Application No. PCT/CN2022/123396, which claims priority to Chinese Patent Application No. 202111172527.9, filed on Oct. 8, 2021 and entitled "Method, apparatus, terminal and storage medium for document processing", the entirety of which is incorporated herein by reference.

FIELD

The present disclosure relates to the field of computer technology, and more particularly to a method, apparatus, terminal and storage medium for document processing.

BACKGROUND

Column layout is a display function used for horizontal layout in document products, allowing multiple contents to be displayed in a horizontal layout. Through the "column" function, layout effects such as horizontal arrangement of pictures and texts, multiple pictures in the same row, and multiple texts in the same row in the document can be realized. In addition, users are allowed to change the width of the left and right typesetting by adjusting the width of each column. Currently, the solution for creating column areas is to trigger the column option in the page layout of word, thereby choosing to divide into two or more columns.

SUMMARY

The present disclosure provides a method, apparatus, terminal and storage medium for document processing.

The present disclosure adopts the following technical solution.

In some embodiments, the present disclosure provides a method for document processing, comprising:

- determining a current state of a column area in a document area;
- if the current state is an unselected state, displaying the column area and a non-column area integratedly; or
- if the current state is a selected state, displaying the column area and the non-column area separately.

In some embodiments, the present disclosure provides an apparatus for document processing, comprising:

- a determining apparatus configured to determine a current state of a column area in a document area; and
- a controlling apparatus configured to, if the current state is a non-selected state, display the column area and a non-column area integratedly: or, if the current state is a selected state, display the column area and the non-column area separately.

In some embodiments, the present disclosure provides a terminal, comprising: at least one memory and at least one processor:

- wherein the memory is used to store program code, and the processor is used to call the program code stored in the memory to execute the above method.

In some embodiments, the present disclosure provides a computer-readable storage medium, wherein the computer-readable storage medium is used to store program code, and the program code, when executed by a processor, causes the processor to perform the above method.

In the method for document processing provided by an embodiment of the present disclosure, when a column area is in a selected state, the column area is distinguished from a non-column area, so that the column area can be separated from the non-column area and the user knows where the boundary of the column area is. When the column area is not selected, the display effect can be improved.

BRIEF DESCRIPTION OF THE DRAWINGS

In conjunction with the accompanying drawings and with reference to the following detailed implementations, the above and other features, advantages and aspects of the various embodiments of the present disclosure will become more apparent. Throughout the drawings, like or similar reference numerals denote like or similar elements. It should be understood that the drawings are illustrative and that means and elements are not necessarily drawn to scale.

DETAILED DESCRIPTION

Figure 1:
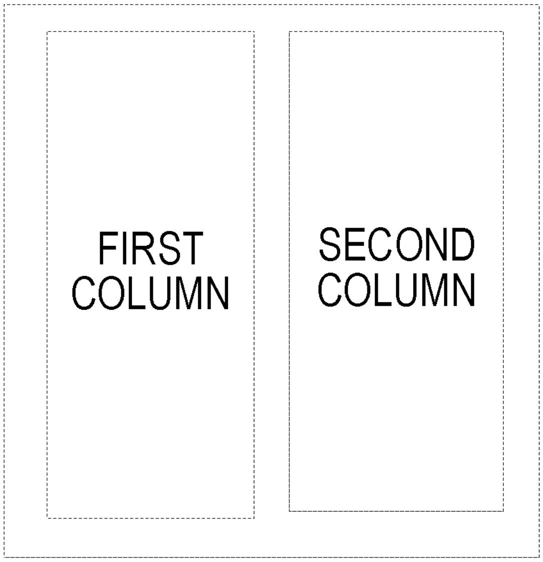
FIG. 1 is a schematic diagram of a column display according to an embodiment of the present the disclosure.

The following embodiments of the present disclosure will be described in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of the present disclosure.

It should be understood that the various steps described in the method implementation method of the present disclosure can be executed in parallel. In addition, the method implementations can include additional steps and/or omit the steps shown. The scope of the present disclosure is not limited in this regard.

The term "including" and its variations used in this article are open-ended, i.e. "including but not limited to". The term "based on" means "at least partially based on". The term "one embodiment" means "at least one embodiment": the term "another embodiment" means "at least one additional embodiment": and the term "some embodiments" means "at least some embodiments". Relevant definitions of other terms will be given in the following description.

It should be noted that the concepts of "first" and "second" mentioned in this disclosure are only used to distinguish different apparatuses, modules, or units, and are not used to limit the order or interdependence of the functions performed by these apparatuses, modules, or units.

It should be noted that the modification of "one" mentioned in this disclosure is illustrative and not restrictive. Those skilled in the art should understand it as "one or more" unless otherwise specified in the context.

The names of the messages or information exchanged between multiple devices in this public implementation are for illustrative purposes only and are not intended to limit the scope of these messages or information.

The schemes provided by the embodiments of the present disclosure will be described in detail below with reference to the accompanying drawings.

In the document area, the contents in the document can be displayed in the form of creating columns. As shown in FIG. 1, the column area is arranged horizontally, the column area and the non-column area are displayed integratedly. Without displaying text, it is impossible to distinguish between the column area and the non-column area.

Figure 2:
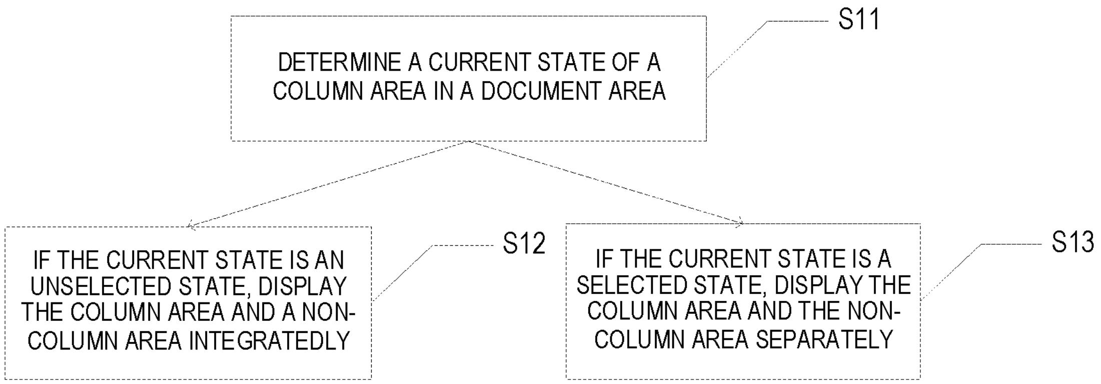
FIG. 2 is a flowchart of a method for document processing according to an embodiment of the present the disclosure.

A method for document processing is proposed in the present disclosure. FIG. 2 is a flowchart of a method for document processing according to an embodiment of the present disclosure, comprising the following steps.

S11: Determine a current state of a column area in a document area.

In some embodiments, the document area refers to an area in the document for inputting and displaying text. The document area may display text or no text, and the column area refers to the area that is set to be displayed in columns. The column area is usually arranged horizontally side by side in the document area, and the column area may or may not have text, and may or may not have pictures. The current state of the column area can be divided into a selected state and an unselected state, and step S12 and step S13 are performed based on different selection of the current state.

S12: If the current state is an unselected state, display the column area and a non-column area integratedly.

In some embodiments, when a control mark (e.g., a mouse) hovering over the document area, or click on the document area, or an edit mark (e.g., a short vertical line for displaying the editing position in the document) is located within the document area, or the selection stays in the column area, the column area is in a selected state. If the above conditions are not met, the column area may be in an unselected state. When it is in the unselected state, the column area and a non-column area are displayed integratedly. At this time, if there is no text displayed in the column area, it is impossible to distinguish whether the area is the column area, and at this time, the background color of the column area is the same as the background color of the non-column area, and the boundary of the column area is not displayed.

S13: If the current state is a selected state, display the column area and the non-column area separately.

In some embodiments, when the column area is in a selected state, the column area is distinguished from the non-column area. The displaying the column area and the non-column area separately comprises at least one of the following: displaying a background color different from that of the non-column area in the column area, displaying a boundary line of the column area. In this way, the column area can be distinguished from the non-column area, so that the user knows where the boundary of the column area.

In order to better illustrate the method proposed in the embodiments of the present disclosure, a specific embodiment is proposed below. In this embodiment, in the column area of the document area, the gray background color can be used to remind the user of the location of the current editing area, which allows the user to effectively distinguish whether is the area in the column area and quickly switch between the column area and the non-column area. When the mouse hovers, the cursor or the selection stays in the column area, the gray background color (different from the background color of the non-column area) is displayed in the column area to prompt the area where the current column area is located and the content under this area; when the mouse moves away, the cursor or selection moves away from the column layout area, the gray background color prompt of the column area disappears, making the document body and the column area integrated.

In some embodiments of the present disclosure, before determining the current state of the column area in the document area, the method further comprises: in response to a column area creation event, creating the column area within the document area. In some embodiments, the column area can be created in various ways, which is not limited.

In some embodiments of the present disclosure, the in response to a column area creation event, creating the column area within the document area comprises: in response to a first operation event on a first control, displaying a column creation interface comprising a predetermined number of column thumbnails, and in response to a selection operation on the column thumbnails, creating a selected number of the column areas within the document area based on the selected number of selected column thumbnails.

Figure 3:
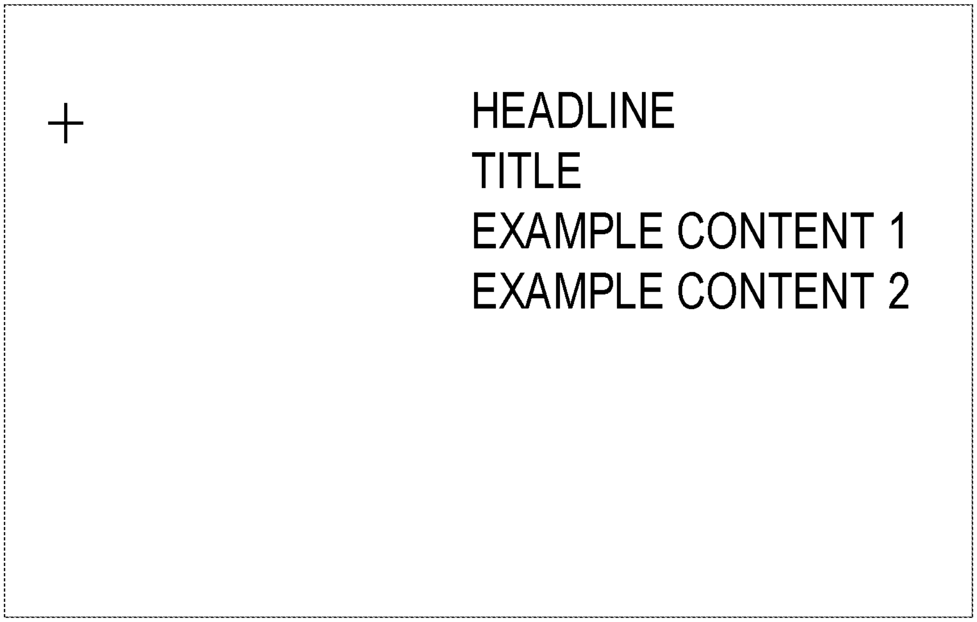
FIGS. 3 to 5 are schematic diagrams of creating a column area in a document area according to an embodiment of the present the disclosure.

In some embodiments, please refer to FIG. 3. The "+" in FIG. 3 can be a first control, and a secondary panel corresponding to the first control can be displayed by hovering the control mark (such as a mouse) over the first control. The secondary panel can be a function option list in FIG. 4, which has multiple options. The column creation interface is displayed by triggering a column option. There are multiple column thumbnails displayed on the column creation interface. The user can complete the selection of the number of column areas in the form of selecting the column thumbnail. The selected number is the number of selected column thumbnails. Taking the selected number as 2 as an example, two column areas are created in FIG. 5. By displaying the column thumbnails for selection, the user's interactive experience is improved. The way to select the column thumbnail can be that the control mark hovers over the column thumbnail.

Figure 4:
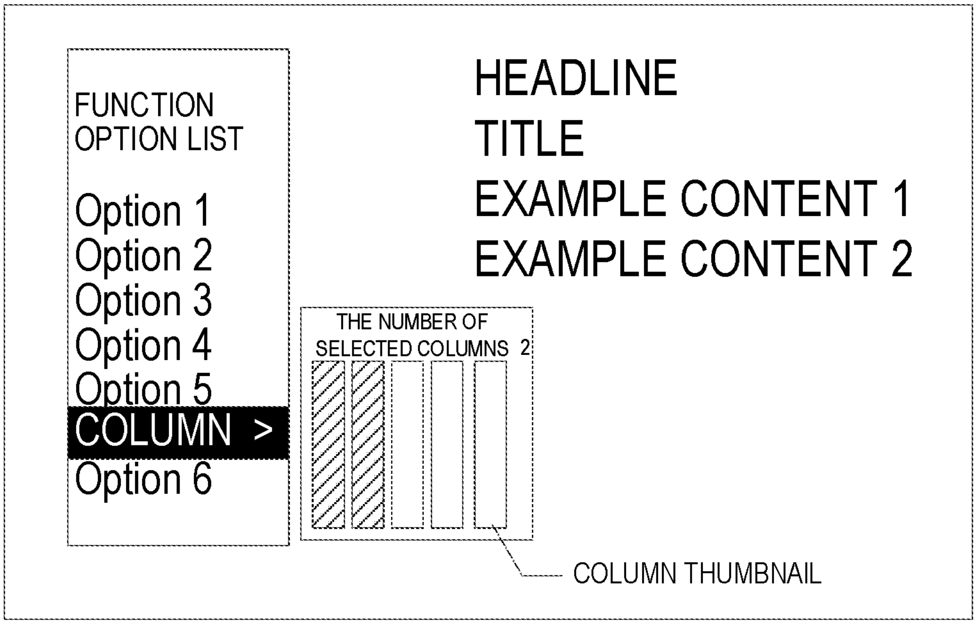
Figure 5:
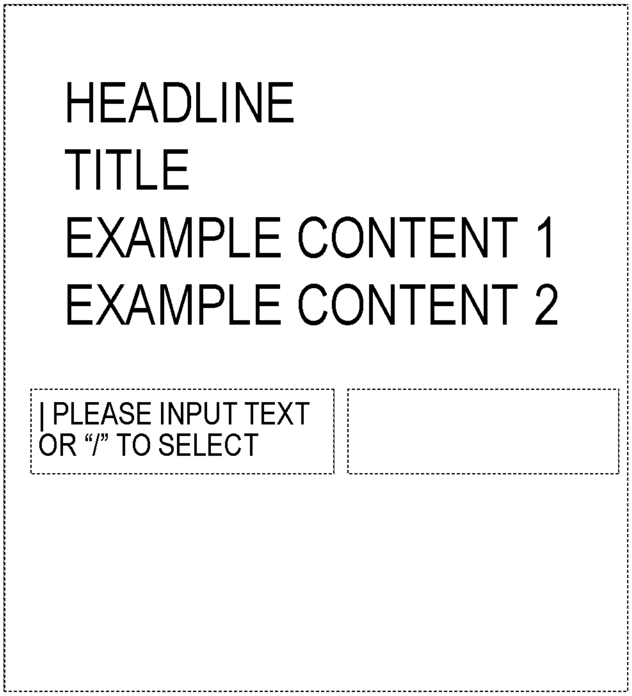

In some embodiments of the present disclosure, display the selected column thumbnails in a first style and display unselected column thumbnails in a second style in the column creation interface. As shown in FIG. 4, the selected thumbnail can change the color filled therein or be highlighted, so that the user can directly determine the number of selected column thumbnails. In some embodiments, the number of selected column thumbnails is displayed in the column creation interface, for example, "the number of selected columns 2" is displayed in FIG. 4. In some embodiments, select one of the column thumbnails by default in the column creation interface.

In some embodiments of the present disclosure, after creating the column area within the document area, further comprising: displaying an edit mark in a created column area. When the edit mark is located in the column area, the column area is in a selected state. In some embodiments, please refer to FIG. 5, after completing the creation of the column area, the edit mark (such as the cursor "|") is displayed in the column area, and the column area and non-column area are displayed separately to prompt that the current column area can be edited. In some embodiments, when the cursor or selection appears in the column area or the control mark such as the mouse hovers over the column area, the background color of the column area is displayed to display the display column area and the non-column area separately. Prompt information can be displayed in the column area, and the prompt information can be, for example, "input a predetermined symbol to select".

In some embodiments of the present disclosure, the displaying an edit mark in a created column area comprises: displaying the edit mark in a first column of a target column area in the created column area: wherein the target column area is a column area closest to a target side in the created column area. In some embodiments, when creating the column area, one or more column areas can be created, wherein the column area closest to the target side is the target column area, for example, the target side can be left side, the target column area is the leftmost column area in the created column area. The edit mark is displayed in the first column of the target column area, the first column can be the first row counted from top to bottom, that is, the edit mark can be displayed in the first row on the upper left of the created column area, which is most in line with the user's writing habits and starts writing from the upper left.

In some embodiments of the present disclosure, in response to a second operation event on a second control displayed in an associated area of the column area, add a new column area to a side of the existing column area. In some embodiments, please refer to FIG. 6, the second control (a small dot in the FIG) is displayed on the upper right corner of the column area (the area where the example content is located). By performing the second operation event on the second control, columns can be added to the right side of the existing column. In some embodiments, a column area corresponds to a second control, and a new column is added to the position where the second control is located.

In some embodiments of the present disclosure, the in response to a second operation event on the second control, adding a new column area to a side of the existing column area comprises: in response to a triggering operation on the second control, hiding the second control and displaying a third control, and in response to a triggering operation on the third control, adding the new column area to one side of the column area: wherein a display area of the second control is smaller than a display area of the third control.

Figure 6:
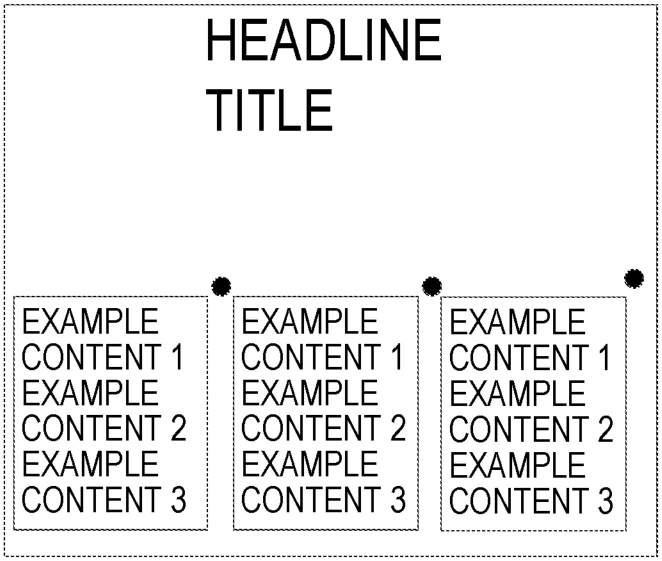
FIGS. 6 to 7 are schematic diagrams of adding a new column area according to an embodiment of the present the disclosure.
Figure 7:
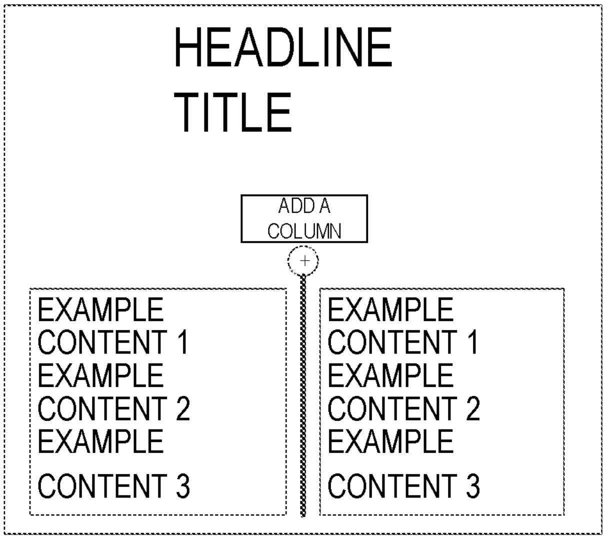

In some embodiments, please refer to FIGS. 6 and 7, when the control mark hovers over the second control, hide the second control, display the third control as shown in FIG. 7, and a prompt message "add new column" is displayed on the third control. The third control also prompts the position of the new column. Triggering the third control such as by clicking or the like can add columns at the position prompted by the third control. In some embodiments of the present disclosure, the display area of the second control is smaller than that of the third control, which can reduce the occupation of the display area.

In some embodiments of the present disclosure, the in response to a column area creation event, creating the column area within the document area comprises: in response to inputting a predetermined character, displaying an option menu, and in response to a third operation event on a column option in the option menu, creating the column area: or, in response to inputting a predetermined character and column text information, searching for a column option which matches the column text information in an option menu and displaying a searched column option, and in response to a third operation event on the column option, creating the column area.

Figure 8:
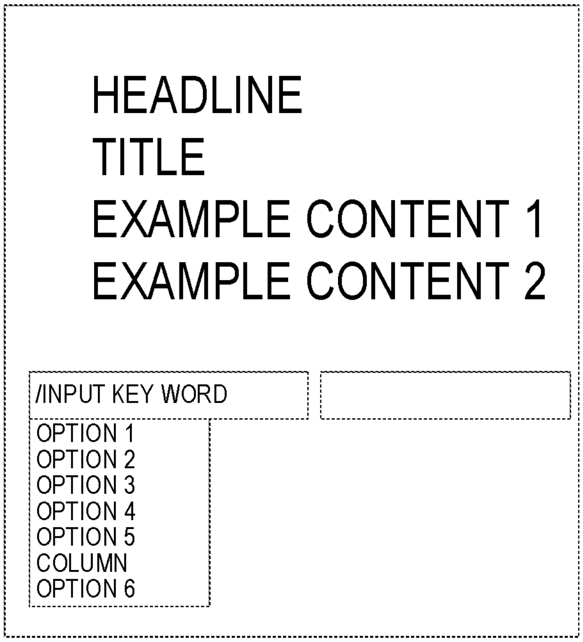
FIG. 8 is a schematic diagram of a display after inputting a preset character according to an embodiment of the present the disclosure.

In some embodiments of the present disclosure, predetermined characters are set in advance, and the predetermined characters can be characters whose frequency of use is lower than the frequency threshold. When the predetermined characters are input in the document area, an option menu can be evoked. After the option menu is evoked, the options in the option menu can be directly selected. After the option menu is evoked, if text information continues to be input after the predetermined characters, in response to the input text information, the options related to the text information can be queried in the option menu. When the options are hidden in the sub-menu or multi-level menu of the option menu, the user can query the options by searching instead of repeatedly seeking in the options. In some embodiments, please refer to FIG. 8, after the predetermined character "/" is input in the column area (which can also be input in the non-column area), the option menu is displayed, and "option 1, option 2" and the like are displayed. At this time, the user can click the "column" option to create a column area with the control mark, or continue to input text characters such as "column", "fenlan", "fl" after the predetermined characters to search for the column function. After creating a new column area, the edit mark will be automatically positioned in the newly added column area. In some embodiments, input "/" (both full-width & half-width are both acceptable) at the beginning of the line or after a space in the line, evoke the "/" shortcut command panel, and search for any keyword such as "column", "fenlan", "fl", and "Slash Command" to hit the "column" function. Click to add a new column and position the cursor on the new column.

In some embodiments of the present disclosure, if an input predetermined character is located in an existing column area, a new column area is added to a side of the existing column area where the predetermined character is located, and the new column area is a column area which is created in response to the column area creation event. In some embodiments, on the basis of the existing column area, the column area can still be created in the same process through the "/" shortcut command, and the created column area will be added to the existing column area as a new column area. In this way, a new column area can be added to the right of the existing column area by inputting characters in the existing column area.

In some embodiments of the present disclosure, the in response to a column area creation event, creating the column area within the document area comprises: in response to dragging a first content block to a lateral side of a second content block in the document area, creating a column area carrying the first content block and a column area carrying the second content block: wherein the content block is a unit carrying document content. In some embodiments, when one or more content blocks are dragged to the right or left of another content block, the dragged content block and the other content block are created into a horizontal column area for display. In some embodiments, the content block may be a piece of text, content within a text box, etc., which serves as the basic unit carrying the content.

In some embodiments of the present disclosure, the method further comprises: in response to a fourth operation event on the column area, display a snapshot of the column area on which the fourth operation event is performed, and in response to a drag operation on the snapshot, adjust a position of the column area based on a position to which the snapshot is dragged.

Figure 9:
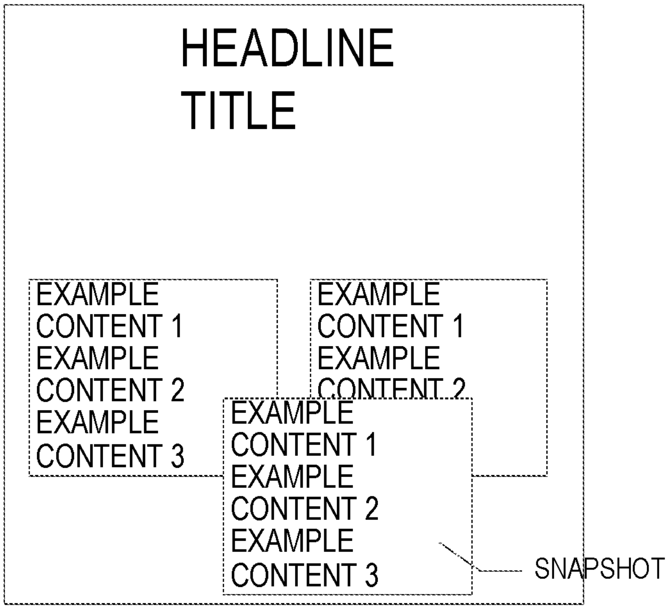
FIG. 9 is a schematic diagram of a document area being dragged according to an embodiment of the present the disclosure.

In some embodiments, the fourth operation event may be a click operation, please refer to FIG. 9, click on the border area of the column area with the control mark, press and drag to display the snapshot, and drag the snapshot into the left or right area of another column area to adjust the column area.

In some embodiments of the present disclosure, before adjusting the position of the column area, if one or both sides of the column area have a first adjacent column area, after adjusting the position of the column area, adjust a position and/or size of the first adjacent column area. In some embodiments, before dragging the snapshot of the column area, if there are three column areas in a row, and one column area is adjusted to the other rows, resulting in only two column areas in this row (the first adjacent column area), the size and position of the first adjacent column area can be adjusted according to the remaining number of column areas and the size of the document area, for example, the horizontal display size can be increased.

Similarly, in some embodiments, if one or both sides of the position where the column area is adjusted have a second adjacent column area, after adjusting the position of the column area, adjusting the position and/or size of the first adjacent column area. In some embodiments, if the column area is dragged to the middle of the other two column areas, the horizontal size of the second adjacent column area on both sides of the column area can be reduced to make room for the column area. It can also be that the column area on the right side of the position where the column area is adjusted continues to move to the right, thereby leaving space for the column area, or the position and size of each column area can be determined according to the size of the document area and the number of the column areas and the second adjacent column area and adjusted.

In some embodiments of the present disclosure, when the column area is in the selected state, the user can be prompted by changing the background color of the column area where the current editing area is located. This allows the user to effectively distinguish whether the area is in the column area and quickly switch between the column area and the non-column area. Specifically, when the mouse hovers or the cursor/selection stays in the column area, the gray background color is displayed to indicate the area where the current column layout is located. When the mouse moves away or the cursor/selection moves away from the column layout area, the gray background color prompt disappears, making the document body and columns integrated.

In some embodiments of the present disclosure, the column area is in the selected state if at least one of the following is satisfied: an edit mark is located in the column area, a control mark hovers over the column area, or an area selection mark covers at least a portion of the column area. In some embodiments, the control mark can be a mouse, the edit mark can be an edit cursor, the selection mark can be a selection box displayed by pressing and holding the mouse.

In some embodiments of the present disclosure, when a row of the document area comprises at least two column areas, if at least one of the at least two column areas is in the selected state, both of the at least two column areas are in the selected state. In some embodiments, a row of the document area can be provided with multiple column areas. At this time, the column areas of the same row can be in an associated state. After a column area is selected, other associated column areas of the same row will also be selected, which can reduce the operation steps of selecting the column area, improve processing efficiency, and display all column areas of the entire row at one time when displaying the column area and the non-column area separately.

When creating a new column, an interactive template is provided to select, and the column number can be quickly selected and the column area can be created by sliding the mouse over the column number of the column thumbnails, clearly conveying the visual effect of creating a column area. Specifically, by hovering over the first control to display the option list, when clicking on the column option, the column creation interface is displayed, and the effect of the number of columns inserted into the column area can be set by crossing the corresponding column number with the mouse. By clicking on the column thumbnails, the column area can be quickly inserted, and the cursor appears in the first column of the newly created column area, and a gray background color prompt will be displayed, which is convenient for users to input.

On the basis of the existing column area, the effect of quickly adding a new column area is realized through the second control. Specifically, when the control mark hovers over the middle area of the two column areas, a gray dot (the second control) is displayed to represent the entry to add columns. When the control mark hovers over the gray dot, the dot becomes the add column button (the third control): by clicking the add column button, a new column area is added at the dot.

On the basis of the existing column area, the effect of changing the order of the two columns can be achieved by dragging. Specifically: click the border area of the column area to present a draggable performance, and display a snapshot when dragging; when dragging the snapshot into the left or right area, release the control mark to complete the adjustment of order of the column area.

Some embodiments of the present disclosure provide an apparatus for document processing, comprising:

a determining apparatus configured to determine a current state of a column area in a document area;

a controlling apparatus configured to, if the current state is a non-selected state, display the column area and a non-column area integratedly; or, if the current state is a selected state, display the column area and the non-column area separately.

In some embodiments of the present disclosure, the controlling apparatus is further configured to: in response to a column area creation event, create the column area within the document area.

In some embodiments of the present disclosure, the in response to a column area creation event, creating the column area within the document area comprises: in response to a first operation event on a first control, displaying a column creation interface comprising a predetermined number of column thumbnails, and in response to a selection operation on the column thumbnails, creating a selected number of the column areas within the document area based on the selected number of selected column thumbnails.

In some embodiments, display the selected column thumbnails in a first style and display unselected column thumbnails in a second style in the column creation interface: select one of the column thumbnails by default in the column creation interface: display a number of the selected column thumbnails in the column creation interface.

In some embodiments, the controlling apparatus is further configured to after creating the column area within the document area, display an edit mark in a created column area.

In some embodiments, the displaying an edit mark in a created column area comprises: displaying the edit mark in a first column of a target column area in the created column area; wherein the target column area is a column area closest to a target side in the created column area.

In some embodiments, a second control is displayed in an associated area of the column area, the controlling apparatus is further configured in response to a second operation event on a second control, adding a new column area to a side of the existing column area.

In some embodiments, the in response to a second operation event on the second control, adding a new column area to a side of the existing column area comprises: in response to a triggering operation on the second control, hiding the second control and displaying a third control, and in response to a triggering operation on the third control, adding the new column area to one side of the column area: wherein a display area of the second control is smaller than a display area of the third control.

In some embodiments, the controlling apparatus in response to a column area creation event, creating a column area within the document area, comprises: in response to inputting a predetermined character, displaying an option menu, and in response to a third operation event on a column option in the option menu, creating the column area: or, in response to inputting a predetermined character and column text information, searching for a column option which matches the column text information in an option menu and displaying a searched column option, and in response to a third operation event on the column option, creating the column area.

In some embodiments, if an input predetermined character is located in an existing column area, a new column area is added to a side of the existing column area where the predetermined character is located, and the new column area is a column area which is created in response to the column area creation event.

In some embodiments, the controlling apparatus in response to a column area creation event, creating a column area within the document area comprises: in response to dragging a first content block to a lateral side of a second content block in the document area, creating a column area carrying the first content block and a column area carrying the second content block: wherein the content block is a unit carrying document content.

In some embodiments, the controlling apparatus is further configured to in response to a fourth operation event on the column area, display a snapshot of the column area on which the fourth operation event is performed, and in response to a drag operation on the snapshot, adjust a position of the column area based on a position to which the snapshot is dragged.

In some embodiments, before adjusting the position of the column area, if a or both sides of the column area have a first adjacent column area, after adjusting the position of the column area, the controlling apparatus is further configured to adjust a position and/or size of the first adjacent column area.

In some embodiments, if a or both sides of the position where the column area is adjusted have a second adjacent column area, after adjusting the position of the column area, the controlling apparatus is further configured to adjust the position and/or size of the first adjacent column area.

In some embodiments, the displaying the column area and the non-column area separately comprises at least one of the following: displaying a background color different from that of the non-column area in the column area, or displaying a boundary line of the column area.

In some embodiments, the column area is in the selected state if at least one of the following is satisfied:

an edit mark is located in the column area, a control mark hovers over the column area, or an area selection mark covers at least a portion of the column area.

In some embodiments, when a row of the document area comprises at least two column areas, if at least one of the at least two column areas is in the selected state, both of the at least two column areas are in the selected state.

As for the embodiments of the apparatus, since it basically corresponds to the method embodiments, the relevant parts can be referred to the partial description of the method embodiments. The apparatus embodiments described above is only illustrative, and the modules described as separate modules may or may not be separate. Some or all of the modules can be selected according to actual needs to achieve the purpose of this embodiment. Ordinary technicians in the field can understand and implement it without creative labor.

Method and apparatus of the present disclosure are described based on above embodiments and application examples. In addition, the present disclosure also provides a terminal and a storage medium, these terminals and storage mediums are described in the following.

Figure 10:
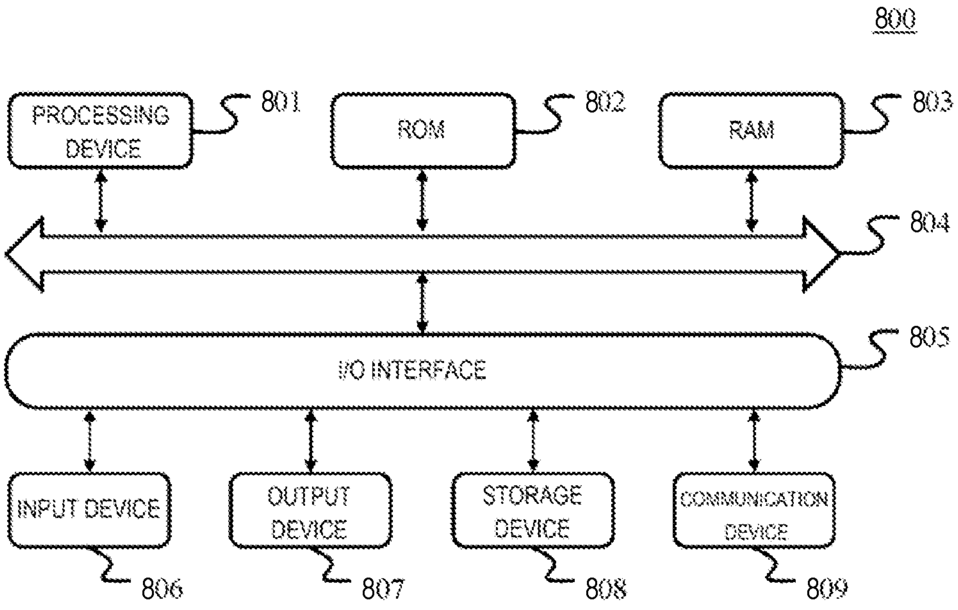
FIG. 10 is a schematic structural diagram of an electronic device according to an embodiment of the present the disclosure.

Reference is made below to FIG. 10, which illustrates a schematic diagram of a structure of an electronic device (e.g., a terminal device or a server) 800 suitable for implementing an embodiment of the present disclosure. Terminal devices in embodiments of the present disclosure may include, but are not limited to, mobile terminals such as cell phones, laptop computers, digital broadcast receivers, PDAs (personal digital assistants), PADs (tablet computers), PMPs (portable multimedia players), vehicle terminals (e.g., vehicle navigation terminals), and the like, and fixed terminals such as digital TVs, desktop computers, and the like. The electronic device illustrated in the figures is only an example and should not impose any limitation on the functionality and scope of use of embodiments of the present disclosure.

The electronic device 800 may include a processing device (e.g., central processor, graphics processor, etc.) 801 that may perform various appropriate actions and processes based on programs stored in read-only memory (ROM) 802 or loaded into random access memory (RAM) 803 from the storage device 808. Also stored in RAM 803 are various programs and data required for the operation of electronic device 800. The processing device 801, ROM 802, and RAM 803 are connected to each other via bus 804. The input/output (I/O) interface 805 is also connected to the bus 804.

Typically, the following devices can be connected to I/O interface 805: input device 806 including, for example, touch screens, touch pads, keyboards, mice, cameras, microphones, accelerometers, gyroscopes, etc.; output device 807 including, for example, liquid crystal displays (LCDs), speakers, vibrators, etc.; storage device 808 including, for example, magnetic tapes, hard drives, etc.; and communication device 809. Communication device 809 may allow the electronic device 800 to communicate wirelessly or wired with other devices to exchange data. Although the drawings illustrate the electronic device 800 with various devices, it should be understood that it is not required to implement or have all of the devices illustrated. More or fewer devices may alternatively be implemented or available.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication device 809, or from a storage device 808, or from a ROM 802. When this computer program is executed by the processing device 801, the above-described functions as defined in the method of this disclosed embodiment are performed.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above, magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted using any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LAN"), wide area networks ("WAN"), internetworks (e.g., the Internet), and end-to-end networks (e.g., ad hoc end-to-end networks), as well as any currently known or future developed networks.

The above computer-readable medium may be contained in the above electronic device; or it may be present separately and not assembled into the electronic device.

The above computer readable medium carries one or more programs which, when executed by the electronic device, cause the electronic device to perform the methods of the present disclosure as described above.

Computer program code for performing the operations of the present disclosure may be written in one or more programming languages or combinations thereof, including object-oriented programming languages—such as Java, Smalltalk, C++, and also including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network-including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in the embodiments of the present disclosure may be implemented by means of software, or by means of hardware. Wherein, the name of the unit does not in some cases constitute a limitation on the unit itself.

The functions described above herein may be performed, at least in part, by one or more hardware logic components. For example, non-limitingly, exemplary types of hardware logic components that may be used include: field-programmable gate arrays (FPGA), application-specific integrated circuits (ASIC), application-specific standard products (ASSP), systems-on-chip (SOC), complex programmable logic devices (CPLD), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. Machine readable media may include, but are not limited to, electronic, magnetic, optical, electromagnetic, infrared, or semiconductor systems, devices, or equipment, or any suitable combination of the foregoing. More specific examples of machine-readable storage media would include one or more wire-based electrical connections, portable computer disks, hard disks, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above any suitable combination of the above.

According to one or more embodiments of the present disclosure, a method for document processing is provided, comprising:

determining a current state of a column area in a document area;

if the current state is an unselected state, displaying the column area and a non-column area integratedly; or, if the current state is a selected state, displaying the column area and the non-column area separately.

According to one or more embodiments of the present disclosure, a method for document processing is provided, before determining the current state of the column area in the document area, further comprising:

in response to a column area creation event, creating the column area within the document area.

According to one or more embodiments of the present disclosure, a method for document processing is provided, the in response to a column area creation event, creating the column area within the document area comprises:

in response to a first operation event on a first control, displaying a column creation interface comprising a predetermined number of column thumbnails, and in response to a selection operation on the column thumbnails, creating a selected number of the column areas within the document area based on the selected number of selected column thumbnails.

According to one or more embodiments of the present disclosure, a method for document processing is provided, further comprising at least one of the following: displaying the selected column thumbnails in a first style and displaying unselected column thumbnails in a second style in the column creation interface: selecting one of the column thumbnails by default in the column creation interface: displaying a number of the selected column thumbnails in the column creation interface.

According to one or more embodiments of the present disclosure, a method for document processing is provided, after creating the column area within the document area, further comprising:

displaying an edit mark in a created column area.

According to one or more embodiments of the present disclosure, a method for document processing is provided, the displaying an edit mark in a created column area comprises: displaying the edit mark in a first column of a target column area in the created column area; wherein the target column area is a column area closest to a target side in the created column area.

According to one or more embodiments of the present disclosure, a method for document processing is provided, in response to a second operation event on a second control displayed in an associated area of the column area, adding a new column area to a side of the existing column area.

According to one or more embodiments of the present disclosure, a method for document processing is provided, the in response to a second operation event on the second control, adding a new column area to a side of the existing column area comprises: in response to a triggering operation on the second control, hiding the second control and displaying a third control, and in response to a triggering operation on the third control, adding the new column area to one side of the column area: wherein a display area of the second control is smaller than a display area of the third control.

According to one or more embodiments of the present disclosure, a method for document processing is provided, the in response to a column area creation event, creating the column area within the document area comprises:

in response to inputting a predetermined character, displaying an option menu, and in response to a third operation event on a column option in the option menu, creating the column area; or, in response to inputting a predetermined character and column text information, searching for a column option which matches the column text information in an option menu and displaying a searched column option, and in response to a third operation event on the column option, creating the column area.

According to one or more embodiments of the present disclosure, a method for document processing is provided, if an input predetermined character is located in an existing column area, a new column area is added to a side of the existing column area where the predetermined character is located, and the new column area is a column area which is created in response to the column area creation event.

According to one or more embodiments of the present disclosure, a method for document processing is provided, the in response to a column area creation event, creating the column area within the document area comprises:

in response to dragging a first content block to a lateral side of a second content block in the document area, creating a column area carrying the first content block and a column area carrying the second content block: wherein the content block is a unit carrying document content.

According to one or more embodiments of the present disclosure, a method for document processing is provided, further comprising: in response to a fourth operation event on the column area, displaying a snapshot of the column area on which the fourth operation event is performed, and in response to a drag operation on the snapshot, adjusting a position of the column area based on a position to which the snapshot is dragged.

According to one or more embodiments of the present disclosure, a method for document processing is provided, before adjusting the position of the column area, if a or both sides of the column area have a first adjacent column area, after adjusting the position of the column area, adjusting a position and/or size of the first adjacent column area.

According to one or more embodiments of the present disclosure, a method for document processing is provided, if a or both sides of the position where the column area is adjusted have a second adjacent column area, after adjusting the position of the column area, adjusting the position and/or size of the first adjacent column area.

According to one or more embodiments of the present disclosure, a method for document processing is provided, the displaying the column area and the non-column area separately comprises at least one of the following:

displaying a background color different from that of the non-column area in the column area, or displaying a boundary line of the column area.

According to one or more embodiments of the present disclosure, a method for document processing is provided, the column area is in the selected state if at least one of the following is satisfied:

an edit mark is located in the column area, a control mark hovers over the column area, or an area selection mark covers at least a portion of the column area.

According to one or more embodiments of the present disclosure, a method for document processing is provided, when a row of the document area comprises at least two column areas, if at least one of the at least two column areas is in the selected state, both of the at least two column areas are in the selected state.

According to one or more embodiments of the present disclosure, an apparatus for document processing is provided, comprising:

a determining apparatus configured to determine a current state of a column area in a document area; and a controlling apparatus configured to, if the current state is a non-selected state, display the column area and a non-column area integratedly: or, if the current state is a selected state, display the column area and the non-column area separately.

According to one or more embodiments of the present disclosure, a terminal is provided, comprising: at least one memory and at least one processor;

wherein the at least one memory is used to store program code, and the at least one processor is used to call the program code stored in the at least one memory to perform any of the above methods.

According to one or more embodiments of the present disclosure, a computer-readable storage medium is provided, the computer-readable storage medium is used to store program code, and the program code, when executed by a processor, causes the processor to perform the above methods.

The above description is only a better embodiment of the present disclosure and a description of the technical principles applied. It should be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed idea. For example, the above features are interchangeable with (but not limited to) technical features with similar functions disclosed in the present disclosure.

Further, while the operations are depicted in a particular order, this should not be construed as requiring that the operations be performed in the particular order shown or in sequential order. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, the various features described in the context of a single embodiment may also be implemented in multiple embodiments individually or in any suitable sub-combination.

Although the present subject matter has been described using language specific to structural features and/or method logical actions, it should be understood that the subject matter as defined in the appended claims is not necessarily limited to the particular features or actions described above. Rather, the particular features and actions described above are merely exemplary forms of claim fulfillment.

We claim:

1. A method for document processing, comprising:

in response to a column area creation event, creating a column area within a document area;

determining a current state of the column area in the document area;

if the current state is an unselected state, displaying the column area and a non-column area integratedly; and, if the current state is a selected state, displaying the column area and the non-column area separately, wherein after creating the column area within the document area, displaying an edit mark in a created column area, wherein, in accordance with the edit mark being displayed in the column area, the column area is in the selected state to distinguish the column area from the non-column area, and prompt information is displayed in a text form to prompt that the column area is editable, wherein the prompt information comprises text indicating that a predetermined symbol is operable to invoke a selection menu in the column area, and the edit mark is automatically positioned in the newly created column area upon completion of the column area creation event, and wherein when a row of the document area comprises at least two column areas, the at least two column areas in the same row are in an associated state, and in accordance with at least one of the at least two column areas being in the selected state, all of the at least two column areas are in the selected state.

2. The method of claim 1, wherein the in response to a column area creation event, creating the column area within the document area comprises:

in response to a first operation event on a first control, displaying a column creation interface comprising a predetermined number of column thumbnails, and in response to a selection operation on the column thumbnails, creating a selected number of the column areas within the document area based on the selected number of selected column thumbnails.

3. The method of claim 2, further comprising at least one of the following:

displaying the selected column thumbnails in a first style and displaying unselected column thumbnails in a second style in the column creation interface;

selecting one of the column thumbnails by default in the column creation interface; or displaying a number of the selected column thumbnails in the column creation interface.

4. The method of claim 1, wherein the displaying an edit mark in a created column area comprises:

displaying the edit mark in a first column of a target column area in the created column area;

wherein the target column area is a column area closest to a target side in the created column area.

5. The method of claim 2, wherein, in response to an operation event on a second control displayed in an associated area of the column area, adding a new column area to a side of the existing column area.

6. The method of claim 5, wherein the operation event on the second control comprises a triggering operation, and in response to the operation event on the second control, adding the new column area to a side of the existing column area comprises:

in response to the triggering operation on the second control, hiding the second control and displaying a third control, and in response to a triggering operation on the third control, adding the new column area to a side of the column area; wherein a display area of the second control is smaller than a display area of the third control.

7. The method of claim 1, wherein the in response to a column area creation event, creating the column area within the document area comprises:

in response to dragging a first content block to a lateral side of a second content block in the document area, creating a column area carrying the first content block and a column area carrying the second content block; wherein the content block is a unit carrying document content.

8. The method of claim 1, wherein the displaying the column area and the non-column area separately comprises at least one of the following:

displaying a background color different from that of the non-column area in the column area, or displaying a boundary line of the column area.

9. The method of claim 1, wherein the column area is in the selected state if at least one of the following is satisfied:

an edit mark is located in the column area, a control mark hovers over the column area, or an area selection mark covers at least a portion of the column area.

10. The method of claim 1, further comprising:

in response to an operation event on the column area, displaying a snapshot of the column area on which the operation event is performed, and in response to a drag operation on the snapshot, adjusting a position of the column area based on a position to which the snapshot is dragged.

11. The method of claim 10, wherein, before adjusting the position of the column area, if one or both sides of the column area have a first adjacent column area, after adjusting the position of the column area, adjusting a position and/or size of the first adjacent column area; and/or, if one or both sides of the position where the column area is adjusted have a second adjacent column area, after adjusting the position of the column area, adjusting the position and/or size of the first adjacent column area.

12. The method of claim 1, wherein creating the column area within the document area comprises:

in response to inputting a predetermined character, displaying an option menu, and in response to an operation event on a column option in the option menu, creating the column area; or, in response to inputting a predetermined character and column text information, searching for a column option which matches the column text information in an option menu and displaying a searched column option, and in response to an operation event on the column option, creating the column area.

13. The method of claim 12, wherein if the predetermined character is input in an existing column area, the column area is added to a side of the existing column area where the predetermined character is located, and the column area is a column area which is created in response to the column area creation event.

14. A terminal, comprising:

at least one memory and at least one processor;

wherein the at least one memory is used to store program code, and the at least one processor is used to call the program code stored in the at least one memory to perform a method comprising:

in response to a column area creation event, creating a column area within a document area;

determining a current state of the column area in the document area;

if the current state is an unselected state, displaying the column area and a non-column area integratedly; and, if the current state is a selected state, displaying the column area and the non-column area separately, wherein after creating the column area within the document area, displaying an edit mark in a created column area, wherein, in accordance with the edit mark being displayed in the column area, the column area is in the selected state to distinguish the column area from the non-column area, and prompt information is displayed in a text form to prompt that the column area is editable, wherein the prompt information comprises text indicating that a predetermined symbol is operable to invoke a selection menu in the column area, and the edit mark is automatically positioned in the newly created column area upon completion of the column area creation event, and wherein when a row of the document area comprises at least two column areas, the at least two column areas in the same row are in an associated state, and in accordance with at least one of the at least two column areas being in the selected state, all of the at least two column areas are in the selected state.

15. The terminal of claim 14, wherein the in response to a column area creation event, creating the column area within the document area comprises:

in response to a first operation event on a first control, displaying a column creation interface comprising a predetermined number of column thumbnails, and in response to a selection operation on the column thumbnails, creating a selected number of the column areas within the document area based on the selected number of selected column thumbnails.

16. The terminal of claim 14, wherein creating the column area within the document area comprises:

in response to inputting a predetermined character, displaying an option menu, and in response to an operation event on a column option in the option menu, creating the column area; or, in response to inputting a predetermined character and column text information, searching for a column option which matches the column text information in an option menu and displaying a searched column option, and in response to an operation event on the column option, creating the column area.

17. The terminal of claim 16, wherein if the predetermined character is input in an existing column area, the column area is added to a side of the existing column area where the predetermined character is located, and the column area is a column area which is created in response to the column area creation event.

18. A non-transitory computer-readable storage medium, wherein the computer-readable storage medium is used to store program code, and the program code, when executed by a processor, causes the processor to perform a method comprising:

in response to a column area creation event, creating a column area within a document area;

determining a current state of the column area in the document area;

if the current state is an unselected state, displaying the column area and a non-column area integratedly; and, if the current state is a selected state, displaying the column area and the non-column area separately, wherein after creating the column area within the document area, displaying an edit mark in a created column area, wherein, in accordance with the edit mark being displayed in the column area, the column area is in the selected state to distinguish the column area from the non-column area, and prompt information is displayed in a text form to prompt that the column area is editable, wherein the prompt information comprises text indicating that a predetermined symbol is operable to invoke a selection menu in the column area, and the edit mark is automatically positioned in the newly created column area upon completion of the column area creation event, and wherein when a row of the document area comprises at least two column areas, the at least two column areas in the same row are in an associated state, and in accordance with at least one of the at least two column areas being in the selected state, all of the at least two column areas are in the selected state.

* * * * *